United States Patent Office

3,257,583
Patented June 21, 1966

3,257,583
IMPULSE GENERATING CIRCUIT FOR INTERMITTENT DISCHARGE MACHINING
Jean Pfau, Geneva, Switzerland, assignor, by mesne assignments, to Elox Corporation of Michigan, Troy, Mich., a corporation of Michigan
Filed May 21, 1962, Ser. No. 196,287
Claims priority, application Switzerland, May 23, 1961, 5,972/61
16 Claims. (Cl. 315—227)

Impulse generating circuits for intermittent discharge machining comprising a D.C. supply source, an electrode and a workpiece, a make and break switch device for producing current impulses and a magnetic energy storage means or accumulator are already known. Such circuits are, however, relatively expensive since the make and break switch device must consist of electronic means such as gas filled or vacuum tubes or transistors because of the high frequency of the discharges. As will be explained in greater detail hereinafter, the known circuits have always been so set up that the full power of the source may be applied to the magnetic energy storage means, the latter releasing this energy to produce an arc between the electrode and the workpiece, whilst the make and break switch device interrupts the connection between the supply source and the storage means.

In such a known circuit, the cut-off power or breaking capacity required in the make and break switch device is relatively large and is equal to, for example, eight times the machining power when the duration of the impulses is equal to half their period which then have a triangular shape.

The present invention is concerned with a circuit of the above kind in which the cut-off power required in the make and break device may be very much less than in the known circuits. Moreover, the circuit with which the invention is concerned is very adaptable as regards the possibilities of varying the width and the spacing of the impulses, as also the current strength during each impulse.

The present invention provides an impulse generating circuit for electrical discharge machining, comprising a D.C. supply source, an electrode and a workpiece, and a periodically operated switching device preferably of the electronic type for producing ionizing current pulses to the gap. Also included is an inductive energy storage means embodied as an inductance, characterized in that the inductive energy storage means, the electrode and the workpiece are connected in series and supplied with current from the source, which current is pulsed by the switching device. At least one unidirectional current conducting device is connected to insure during interruption of the source, the closure of a circuit including the inductive storage means, the electrode, workpiece and the unidirectional current conducting device. The operation of the circuit is such that the closure of the make and break switch device serves to ionize the gap to initiate gap discharge between the electrode and the workpiece. Simultaneous with the closure of the switch device energy is stored in the inductive storage means. Upon opening of the switch device, the energy previously stored in the magnetic storage means is permitted to flow through the gap to provide appreciable current flow for a predetermined time through the inductive storage means, the gap, and the unidirectional current conducting device.

The accompanying drawing illustrates diagrammatically and by way of example several constructional forms of circuit according to the invention.

Figure 1:
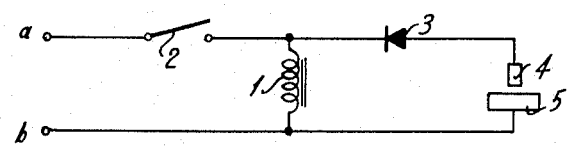
FIGURE 1 illustrates the known circuit referred to above.

The known circuit illustrated in FIGURE 1 comprises a D.C. source of which only the terminals $a$ and $b$ have been shown, these terminals being connected to a magnetic storage means or accumulator 1 constituted by a self-induction coil. A make and break switch device 2 enables the coil 1 to be connected to the terminals $a$ and $b$. A diode 3 is connected in the discharge circuit which includes the self-induction coil 1, an electrode 4 and a workpiece 5. As is well known in electro-erosion, the electrode 4 is placed at a very short distance from the workpiece 5, these two parts being separated one from the other by a liquid which is more often than not dielectric, for example paraffin oil or kerosene.

In this circuit, a current flows through the storage means 1 as soon as the make and break switch device 2 is closed. The current supplied by the source cannot however flow into the discharge circuit because of diode 3.

If ohmic losses are ignored, the current increases linearly due to self-induction so that the magnetic field of the energy storage means increases progressively. When the charging circuit is opened by the make and break switch device 2, the magnetic field opposes the stoppage of the current flow in the coil 1 and this current flow continues to take place by now passing through the workpiece 5, the electrode 4 and the diode 3 until the magnetic field returns to zero, thereby generating triangular impulses.

In the described circuit, it is difficult to obtain impulses which are long relatively to their period since charging the magnetic storage means can only occur during the interval between two successive impulses. Consequently, if impulses lasting 0.8 times the period were required, the interruption between two impulses would be equal to 0.2 times this period so that the time available for charging the electromagnetic storage means is four times less than the duration of a discharge. It is therefore necessary for the make and break device to have a far greater cut-off power than the mean power dissipated between the electrode 4 and the workpiece 5.

In practice, the circuits which have so far been employed differ slightly from the illustrated circuit. The storage means 1 is provided with a secondary coil which causes a current to flow to the diode 3, the electrode 4 and the workpiece 5 so as to adapt the impedance of the source to that of the arc. Despite the resemblance of this storage means to an impulse transformer, it is distinguished therefrom by the fact that its magnetic circuit is capable of storing energy equal to that of an impulse, this being readily apparent from the fact that the primary and secondary currents do not flow at the same time.

Figure 2:
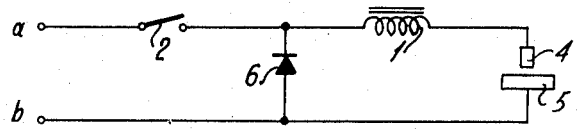
FIGURE 2 illustrates a first, very simple, constructional form of circuit according to the invention.

FIGURE 2 represents a very simple constructional form of circuit according to the invention. It also comprises the terminals $a$ and $b$ of the current source and the make and break switch device 2. The electromagnetic storage means 1 is this time connected in series with the electrode 4 and the workpiece 5, whereas a unidirectionally conductive element constituted by a diode 6 is so connected as to ensure the closure of the circuit consisting of the storage means 1, the electrode 4 and the workpiece 5 during interruption of the supply.

The operation of this circuit differs substantially from that of the known circuit illustrated in FIGURE 1 since the current supplied by the source during closure of the device 2 flows in series through the storage means 1 and the gap between the electrode 4 and the workpiece 5. This current is blocked by the diode 6. However, at the instant the supply current is interrupted by the opening of the device 2, the energy accumulated in the storage means 1 is released and causes a current flow in the closed circuit including the storage means 1, the electrode 4, the workpiece 5 and the diode 6.

Figure 3:
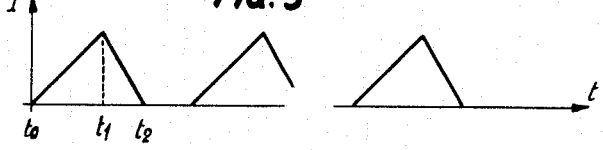
FIGURE 3 shows the appearance of the current in the energy storage means of the FIGURE 2 circuit.

FIGURE 3 is a diagram of the current in the storage means 1 which may advantageously consist of a self-induction coil. At the instant $t_0$ the make and break switch device 2 is closed and the current I increases linearly until instant $t_1$. The slope of the curve $I=f(t)$ depends on the arc voltage across the electrode and the workpiece, on the value of the self-induction coil and on the voltage across terminals $a$ and $b$. The latter voltage must obviously be greater than the arc voltage so that the difference between these two voltages may be applied to the terminals of the self-induction coil and the current variation may be limited in order that the induced voltage may be equal and opposite to the voltage applied to the terminals of the self-induction coil, in accordance with the well-known law:

$$U=\frac{dI}{dt} \cdot L$$

At the instant $t_1$, the make and break switch device interrupts the supply and the current flowing through the storage means 1 diminishes linearly while maintaining the arc across the electrode and the workpiece. The speed at which the current diminishes is still given by the formula:

$$U=\frac{dI}{dt} \cdot L$$

but in this case, the voltage U is equal to the arc voltage and not as before to the difference between the supply voltage and the arc voltage. The slope of the current between $t_1$ and $t_2$ may thus be different from that of the current between $t_0$ and $t_1$, as has been shown in FIGURE 3.

In this circuit, only a part of the energy of each impulse is stored in the storage means 1, and the make and break switch device 2 must have a cut-off power which is slightly greater than the instantaneous maximum power of an impulse. The self-induction coil in the storage means 1 must have a sufficient value for opposing too sudden a variation in the current supplied by the source in the event of a short-circuit occurring between the electrode 4 and the workpiece 5.

The shape of the discharge current impulses obtained in the preceding circuit is not ideal and it would be preferable for the impulses to have a substantially rectangular shape. The circuit shown in FIGURE 4 enables this object to be achieved inasmuch that the energy storage means is constituted by a saturable reactor including a transformer having a substantially rectangular magnetic characteristic, the primary winding 8 of which is connected in series with the electrode 4 and the workpiece 5 and the secondary winding 9 of which is connected to a source B of biasing current through the intermediary of a self-induction coil 10 and of a rheostat 11. The biasing current is adjusted to a value such that the transformer 7 will be in a saturated condition and such that the magnetic field due to the biasing action will oppose the field produced by the flow of discharge current from the source $a$, $b$ to the primary winding 8. Thus at the instant of closing the make and break switch device 2, the primary winding of the transformer, which is saturated, does not oppose the flow of current as long as the latter has not reached the value required to cause the saturation.

Figure 5:
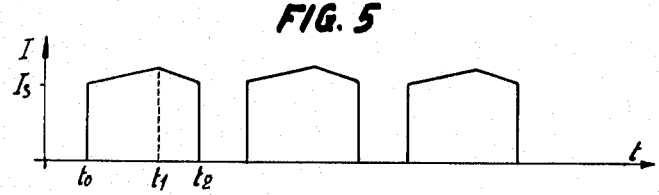
FIGURE 5 shows the appearance of the current in the energy storage means of the FIGURE 4 circuit.

FIGURE 5 shows that at instant $t_0$, the current I increases immediately the value $I_s$ which is the current required to cause the saturation. From that instant, the transformer 7 forms a strong coupling action between its primary and secondary windings 8 and 9, and the current induced in the secondary winding is limited due to the self-induction coil 10 thereby causing a corresponding limitation of the discharge current flowing through the primary winding. This current increases only very slightly from $t_0$ to $t_1$, at which instant the supply is interrupted by the operation of the make and break switch device 2. The current then decreases whilst the self-induction coil 10 discharges, until instant $t_2$ when the field of this coil reaches zero. The current flow in the secondary winding is again equal to the saturation value so that the current flow in the primary winding ceases abruptly.

Figure 6:
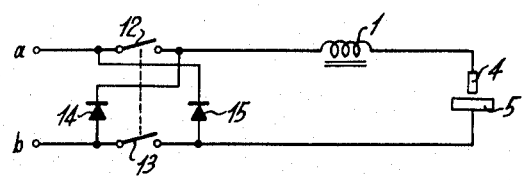
FIGURE 6 shows a modification of the FIGURE 2 circuit.

FIGURE 6 illustrates a modified form of circuit similar to that shown in FIGURE 2, but including two make and break devices, diagrammatically represented in the drawing by two switches 12 and 13, the opening and closing movements of which are synchronised, without necessarily being simultaneous. The diode 6 is replaced by two diodes 14 and 15 which are so arranged that during bipolar interruption, the current supplied by the storage means 1 and flowing across the electrode 4 and the workpiece 5 must flow through the source $a$, $b$ and restore thereto energy. This circuit is mainly intended to operate in conjunction with a source of voltage far higher than that of the arc. Thus assuming that the arc voltage averages 25 v., the source voltage could be at least equal to 100 v. When the switches 12 and 13 are closed, no current flows through the diodes 14 and 15 because of their polarity, and a large proportion of the power supplied by the source is stored in the storage means 1, whereas a smaller part is dissipated between the electrode 4 and the workpiece 5.

Upon opening switches 12 and 13, the current released by the storage means 1 flows through a circuit including the electrode 4, the workpiece 5, the diode 15, the supply source in the direction $a$, $b$, and the diode 14. During release of the energy from the storage means, the source voltage opposes that of the storage means so that the discharge current may both be large and have a short discharge duration. This circuit is thus particularly suitable for obtaining impulses with a steep front. The source may advantageously include a capacitor for receiving the released energy, this capacitor being connected in parallel with the outlet terminals of the source.

In this constructional form, it is also possible to actuate one of the make and break switch devices before the other, thereby making it possible to obtain impulses having a substantially rectangular appearance. Indeed, the source of current can supply energy only if both switches 12 and 13 are closed and at that instant the current flow increases very rapidly since the voltage of the source is much higher than that of the arc. If one of the switches 12 and 13 is opened, the supply of energy is interrupted and the storage means discharges into a circuit constituted by the electrode 4, the workpiece 5 and one of the diodes 14 and 15. During this discharge, the voltage of the source is not opposed to that of the storage means so that the current flow falls much more slowly than it rose at the beginning of the impulse. At the instant the second switch is opened, the current flow falls abruptly to zero, since the voltage of the source is then opposed to that of the storage means. The impulse which is obtained is of substantially rectangular shape or more precisely in the shape of an irregular quadrilateral comparable to a trapezium.

Figure 4:
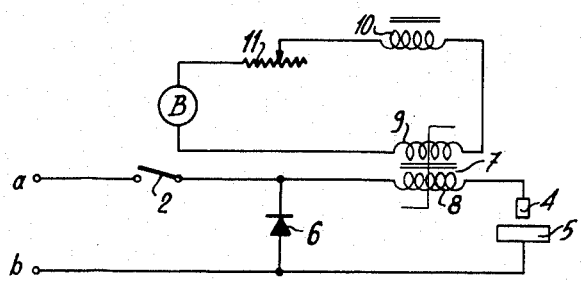
FIGURE 4 illustrates another constructional form of the circuit.
Figure 7:
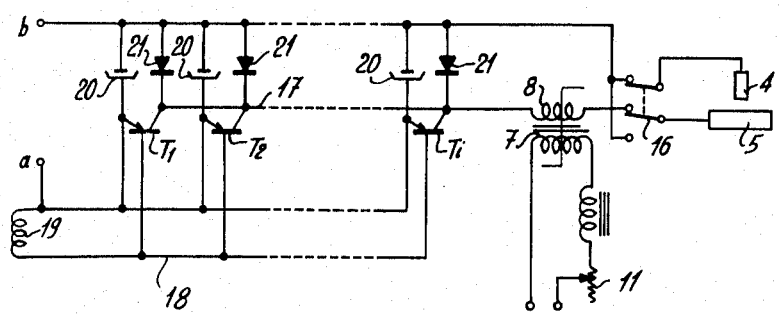
FIGURE 7 shows in greater detail a circuit corresponding to that of FIGURE 4.

FIGURE 7 illustrates in greater detail a circuit comparable to that of FIGURE 4. This circuit comprises the same elements as that of FIGURE 4, but comprises in addition a bipolar change-over switch 16 for selecting at will the polarity of the discharge current across the electrode 4 and the workpiece 5.

The make and break switch device consists of a bank of transistors T of which only a few are shown, i.e. $T_1$, $T_2$ and $T_i$. All of these transistors are connected up in parallel with their emitters connected to terminal $a$ of the source and with their collectors connected to a line 17 which leads to the primary winding 8 of transformer 7 which has a saturable core. All of the bases of these transistors are connected to a line 18 which leads to a winding 19 of a transformer, not shown in full, for transmitting in known manner impulses for controlling simultaneously all of the transistors.

Each transistor is associated with an electrolytic capacitor 20 which contributes to the stability of the voltage of the current source $a$, $b$ by cancelling out the self-induction effects of the source. Each transistor is also associated with a silicon diode 21 so connected that the current released by the magnetic storage means may flow whilst the transistors are blocked. The fact of associating a diode and a capacitor with each transistor is advantageous when a plurality of transistors are connected up to form a bank in that it makes possible maximum reduction of the residual inductance of the electric circuits. To give a practical example applicable to machining by long discharges, the voltage of the source $a$, $b$, may be 40 v., the arc voltage (which depends on the distance between the electrode and the workpiece) is about 25 v., and the duration of the machining impulses is 1 ms., the interval between successive impulses being 0.25 ms. The time during which the make and break switch device remains closed is 0.625 ms. and the time for discharging the storage means is 0.375 ms. The maximum instantaneous current of an impulse is 400 A. The bank comprises thirty germanium power transistors, each associated with a 5000 $\mu$ f. decoupling capacitor 20.

Figure 8:
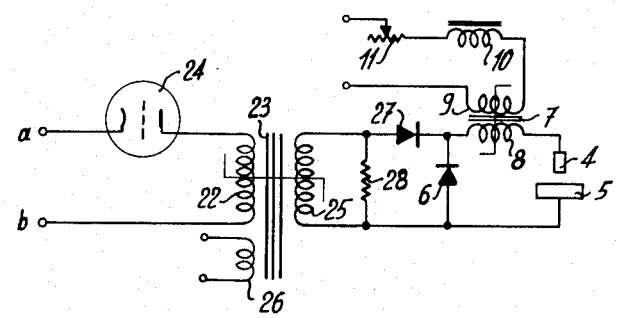
FIGURE 8 illustrates another constructional form of the circuit.

FIGURE 8 shows another constructional form of circuit in which the terminals $a$ and $b$ of the source are connected to the primary winding 22 of an impulse transformer 23, of substantially rectangular magnetic characteristics, through the intermediary of a power vacuum tube 24. The voltage of the source $a$, $b$, may be high and the transformer 23 may have a transforming ratio such that its secondary winding 25 supplies a voltage slightly higher than the voltage of the arc across the workpiece 5 and the electrode 4.

This transformer 23 further includes a polarization winding 26 for maintaining the transformer saturated, this polarization being so selected as to produce a field which is the opposite of that produced by the flow of the supply source current. The secondary winding 25 of the transformer supplies current to a magnetic storage means or accumulator 7, similar to that of FIGURE 4, via a diode 27. The secondary winding 25 is moreover shunted by a resistance 28 which is required to absorb the current produced during demagnetization of the core 23 when tube 24 cuts off the supply of the primary winding. This resistance may of course be provided on any one of the three windings of this transformer 23. When the tube 24 is rendered conductive, the current flowing through the primary winding 22 induces a current in the secondary winding, this latter current serving, on the one hand, to charge the magnetic storage means and, on the other hand, to the maintenance of an arc between the electrode 4 and the workpiece 5. When the current impulse is interrupted by the tube 24, the storage means releases its energy by causing a current to flow through the arc and through the diode 6. Due to diode 27, the voltage of the secondary winding 25, which is now reversed, has no effect on the discharge circuit. This current in the secondary winding 25 can flow because of the resistance 28 thereby enabling the transformer 23 to resume its initial saturated condition.

The biasing winding 26 in energized by a current such as just to cause saturation in the core 23 thereby making it possible to utilize to the full the magnetic field of this transformer.

It should be noted that in this constructional form, the energy stored in the transformer 23 is much less than a machining impulse so that the power dissipated in resistance 28 is small in relation to the mean machining power. In this constructional form, as also in those of FIGURES 2 and 6, the inductance coil may be dispensed with, the magnetic energy storage means then simply consisting of conductors for conveying the current to the electrode and to the workpiece, the inductance of which must then be greater than that of diode 6.

In all the described embodiments, the width and the spacing of the impulses may easily be modified, this being effected by regulating the opening and closing times of the make and break switch device. The amplitude of the impulses may also easily and continuously be regulated by, for example, acting on the voltage supplied by the current source, as in the case of FIGURES 2 and 8, or in a simpler way by acting on the biasing current of the saturable transformer 7, in the case of FIGURES 4 and 7.

An important advantage of the circuit according to the invention is that if the make and break switch device closes at a time when the electrode 4 is over-spaced from the workpiece 5, no current flows and no over-voltages can occur at the terminals of the make and break switch device, as is the case in known circuits of the kind shown in FIGURE 1. Moreover, the illustrated circuits make it possible to obtain a ratio between the duration of an impulse and the period of these impulses which is almost equal to one, which is particularly advantageous when machining with the aid of long impulses. A further advantage is obtained without difficulty owing to the fact that the time during which the make and break switch device is open, is longer than the time separating two successive impulses. In all of the described circuits, it is of advantage to provide a safety device for preventing the make and break switch device from closing when the storage means still contains energy, as may happen when a short-circuit occurs between the electrode and the workpiece 5.

I claim:

1. Apparatus for machining a conductive workpiece by electrical discharge across a gap in the presence of a dielectric coolant comprising a machining power source, a periodically opened and closed switch operatively connected between said source and said gap for providing machining pulses thereto, an inductive storage means connected in series with said switch and said gap, said inductive storage means energized in phase with the closure of said switch and the firing of said gap, and a unidirectional current conducting device connected across said inductive storage means and said gap, said device phased to block current flow during closure of said switch and phased to conduct current flow from said inductive storage means during opening of said switch, said inductive storage means operable to provide continued current flow through said gap and said device a predetermined time after opening of said switch.

2. The combination as set forth in claim 1 in which said inductive storage means comprises a saturable reactor having its primary winding connected in series between said switch and said gap and having its secondary winding connected to a variable current source for selectively varying the saturation of said primary winding.

3. The combination as set forth in claim 1 in which said switching means comprises at least one transistor having its power electrodes connected in series between said source and said gap and a pulsing means operatively connected to its control electrode for rendering it alternately conductive and nonconductive.

4. The combination as set forth in claim 1 in which a transformer is operatively connected between said switching means and said gap, said transformer having its primary winding connected in series with said switch and said source, said transformer having its secondary winding operatively connected across said inductive storage means and said gap.

5. The combination as set forth in claim 4 in which said switch comprises a periodically operated electronic tube.

6. The combination as set forth in claim 1 in which said switching means includes a plurality of transistors, each having its principal electrodes in series with said source and said inductance and a pulse transformer operatively connected to the control electrode of said transistors for rendering them conductive and nonconductive in phase.

7. The combination as set forth in claim 1 in which said inductive storage means comprises an inductance connected in series with said switch and said gap and in which said device is connected across said inductance and said gap.

8. The combination as set forth in claim 2 in which an inductance is connected in series with said secondary winding and said current source.

9. The combination as set forth in claim 3 in which an electrolytic storage capacitor is connected across said power source.

10. Apparatus for machining a conductive workpiece by a tool electrode by electrical discharge across a gap in the presence of a dielectric coolant comprising a source of machining power, a first electronic switching means and an inductance connected in series between one terminal of said source and one terminal of said gap, a second switching means connected in series between the other terminal of said source and the other terminal of said gap, a unidirectional current conducting device connected across said first switching means and said source, and a second unidirectional current conducting device connected across said second switching means and said source, said first and second switches operable at the same time to connect said power source to said gap to provide ionizing pulses thereto, said first and second switches operable sequentially to disconnect said power source from said gap to provide machining pulses to the gap of substantially rectangular shape.

11. A pulse generator circuit for providing electrical pulses across a load comprising a power source, a periodically opened and closed electronic switch operatively connected between said source and said load for providing pulses thereto, an inductive storage means connected in series with said switch and said load, said inductive storage means energized in phase with the closure of said switch and the providing of a pulse to said load, and a unidirectional current conducting device connected across said inductive storage means and said load, said device phased to block current flow during closure of said switch and phased to conduct current flow from said inductive storage means during opening of said switch, said inductive storage means operable to provide continued current flow through said load and said device a predetermined time after opening of said switch.

12. The combination as set forth in claim 11 in which said inductive storage means comprises a saturable reactor having its primary winding connected in series between said switch and said load and having its secondary winding connected to a variable current source for selectively varying the saturation of said primary winding for controlling said predetermined time.

13. The combination as set forth in claim 11 in which said switching means comprises at least one transistor having its power electrodes connected in series between said source and said load and a pulsing means operatively connected to its control electrode for rendering it alternately conductive and nonconductive.

14. Apparatus for machining a conductive workpiece by a tool electrode by electrical discharge across a gap in the presence of a dielectric coolant comprising a source of machining power, at least one transistor having its power electrodes connected in series with a secondary winding of a saturable reactor and said gap, means for pulsing said transistor to render it alternately conductive and nonconductive, a unidirectional current conducting device connected across said secondary and said gap, said device phased to block current flow during the conductive state of said transistor and phased to conduct current flow from said secondary during the nonconductive state of said transistor, said secondary operable to provide continued current flow through said gap and said device a predetermined time after opening of said switch.

15. The combination as set forth in claim 14 in which a bank of transistors are connected in common emitter relationship between said source and said secondary, each of said transistors having a like unilateral current conducting device connected to its collector and across said secondary and said gap.

16. The combination as set forth in claim 15 in which a plurality of electrolytic storage capacitors are included, each of said capacitors connected between the emitter of one of said transistors and said source.

References Cited by the Examiner

UNITED STATES PATENTS

| 2,876,386 | 3/1959 | Fefer et al. | 315—227.1 |
| 3,089,059 | 5/1963 | Porterfield et al. | 219—69 X |

FOREIGN PATENTS

| 762,902 | 3/1961 | Great Britain. |
| 862,902 | 3/1961 | Great Britain. |
| 98,290 | 6/1961 | Netherlands. |

JAMES D. KALLAM, *Acting Primary Examiner.*

JOHN W. HUCKERT, *Examiner.*

A. S. KATZ, D. E. PITCHENIK, *Assistant Examiners.*